(12) United States Patent
Loeffler

(10) Patent No.: US 12,437,037 B2
(45) Date of Patent: Oct. 7, 2025

(54) CONTINUOUS IDENTITY

(71) Applicant: www.TrustScience.com Inc., Edmonton (CA)

(72) Inventor: Martin Loeffler, Toronto (CA)

(73) Assignee: WWW.TRUSTSCIENCE.COM INC., Edmonton (CA)

( * ) Notice: Subject to any disclaimer, the term of this patent is extended or adjusted under 35 U.S.C. 154(b) by 199 days.

(21) Appl. No.: 18/460,038

(22) Filed: Sep. 1, 2023

(65) Prior Publication Data
US 2025/0080520 A1  Mar. 6, 2025

(51) Int. Cl.
G06F 21/30 (2013.01)
G06N 20/00 (2019.01)
H04L 9/32 (2006.01)
H04L 9/40 (2022.01)
G06Q 20/40 (2012.01)

(52) U.S. Cl.
CPC ............. *G06F 21/30* (2013.01); *G06N 20/00* (2019.01); *H04L 9/32* (2013.01); *H04L 63/08* (2013.01); *G06Q 20/40* (2013.01)

(58) Field of Classification Search
None
See application file for complete search history.

(56) References Cited

U.S. PATENT DOCUMENTS

| 10,180,969 | B2 * | 1/2019 | Trudel | G06F 16/23 |
| 2019/0095174 | A1 * | 3/2019 | Trudel | G06F 16/23 |
| 2020/0272645 | A1 * | 8/2020 | Trudel | G06F 16/2465 |
| 2021/0125084 | A1 * | 4/2021 | Kommoju | G06Q 50/26 |

OTHER PUBLICATIONS

Correction Notice for Chinese Patent Application Serial No. 202411219469.4 dated Oct. 16, 2024, 2 pages.

* cited by examiner

*Primary Examiner* — Shirley X Zhang
(74) *Attorney, Agent, or Firm* — Amin, Turocy & Watson, LLP

(57) ABSTRACT

Systems and methods are provided for the use of determining continuous identity over time and in real-time such that a request to verify the identity of an individual that includes a plurality of partial identifiers leads to a prompt response by a computing system employing a machine learning algorithm in a manner that is objective, substantially linearly scalable, and explainable due to the application of objective parameters. A request for identification verification may be made with a partial set of identifiers of the individual to be identified. The computing system may access a database of credentials and a database of strengths of relationships between credentials, and provide information from such credentials to a machine learning algorithm that uses the credentials, strengths of relationships, weighting, and a tunable risk tolerance to determine whether to verify or refute the identity, or neither.

20 Claims, 6 Drawing Sheets

CONTINUOUS IDENTITY

TECHNICAL FIELD

This invention relates generally to the use of machine learning algorithms for the management and curation of a collection of credentials for use in enhancing trustworthiness of identity determination.

BACKGROUND

In certain contexts, humans currently determine identity based on the use of multiple incomplete credentials. For example, if a person refuses or is unable to identify themself to authorities, those authorities might collect partially identifying information. Alternatively, if a person is seeking to identify themself but does not possess definitive identification credentials, it may be necessary to seek to verify the identity using partially identifying information. Or if someone is seeking to identify a deceased body or to identify a person captured in video or photo, it may be necessary to seek an identity using partially identifying information. Commonly, if the person or deceased body is present, it is possible to collect at least some information including fingerprints, one or more photographs, and other identification information such as height, weight, hair color, eye color, apparent age, dental and other data such as observable deviations from usual appearance, including identification of or photos of any scars, tattoos, missing appendages, etc. In many circumstances, less than all information is available.

For example, if a traffic camera captures a photo or video of a person driving through a red light or speeding, it may be possible that only partial identifying information is available. For example, such information may include one or more of the following: a partial identification of vehicle make, model, and year, a partial license number, a black and white or color photograph or video through a window of the vehicle that may be blurry or low resolution and may show only certain incomplete characteristics of driver and/or passengers such as size, skin tone, hair color, presence or absence of facial hair, certain clothing details, etc. Such details may not individually be enough to identify the driver with certainty. So it might be necessary to take further steps toward identification.

As another example, a corpse of a deceased person might be found in some state of decay or degradation that makes immediate visual or fingerprint recognition difficult or impossible. That corpse might possess partial fingerprints, partial facial features, some hair, some teeth, or other physical information from which an identity might be determined. Additionally, the corpse might be partially or fully clothed such that brands, sizes, patterns, etc. might be matched to photographs or other information. The corpse might be in possession of or near some documents such as receipts for purchases, wallet with certain documents, or other types of documents or items. Identification might require steps beyond merely observing the corpse and nearby documents.

A person seeking a passport might be required to present various types of documents to demonstrate entitlement to the passport. Such documents might not be easily obtainable or verifiable by a human. Such documents might include discrepancies due to typographical errors such as a misspelled name or address, or discrepancies in photographs that were taken at different stages of a person's life. Other discrepancies may be present. Thus, confirming identification might require steps beyond merely observing the documents.

In some instances, it may be necessary for a person with a changed name to verify identity. A person who was divorced (or a child of a divorced person) might have a change in name. A person who was threatened by another might have obtained a legal name change to feel more secure from being tracked by the threatening person but might otherwise possess the same or similar identifying details as possessed before the name change. In such circumstances, a photo or a taxpayer identification number might be the same on various documents, while the name, address, or other information might vary. Confirming identification might require steps beyond merely observing the documents.

A person brought to a medical center in a coma might not have an immediately verifiable identification present. And circumstances might not allow for immediate identification by fingerprints. In such instances other data points such as tattoos, hair color, eye color, height, weight, skin tone, scars, various other features of the body, clothing type or style, receipts or other documents in pockets or with the person, and other items might provide clues to the identity of the person. However, confirming identification might require steps beyond merely observing these items.

In some circumstances, a person seeking a loan, submitting a job application, applying to a university, or otherwise seeking to gain access to a professional or commercial venture might submit application information with possible or apparent inconsistencies. In such situations, further identification of the identity might be required.

Various types of identification techniques such as biometric identification (e.g., fingerprint or dental records) and identification by database searching or comparing documents visibly are known in the art but are deployed in a manner that is not reliably repeatable, objective, and scalable.

For example, using collected data, a human might initiate multiple searches hoping to verify the identification of the individual based on the available data points. However, different humans might proceed in different manners according to their own intelligence, training, biases, or other differences. And scaling searches from a single search, to one hundred searches, to thousands or millions of searches performed by humans results in significant overhead as the orders of magnitude of the numbers of searches increases. Such overhead may be in the form of management, human resources, additional desks and additional buildings for workers, travel time to distribute assignments, coordination of workers, etc.

As deployed in the various known systems, biometric validation may use a process of validating an individual through taking a record of an individual's biomarkers (e.g., a fingerprint, taken from multiple angles, degrees of rotation, positions, etc.). Then, when an individual presents their biomarker to identify themselves, a sub-set of measured points may be taken to authenticate the identity of that individual. This allows a certain amount of inconsistency (also referred to as 'noise') to be present in the process, and still have the process work. Systems such as this example of fingerprint measurement result in a two-dimensional database of markers but are not known to incorporate a time dimension.

Similar processes are known to be employed by using data other than biomarkers. For example, numerous individual databases can be searched using a given name, a surname, or a birthdate. Such databases are often isolated from one another. Further, such databases may not be able to track the change in a surname or the change in both a given name and surname over time. Where such changes may occur, the changes are likely to result in a lengthy human verification process at many levels, which may stretch an identity verification process into days, weeks, or even months, or which may result in an unexplainable mismatch.

In view of the many problems present in existing systems, it is desirable to have a reliably repeatable process and system for determining an entity's continuous identity in real-time.

It is further desirable to have an objective process and system for determining an entity's continuous identity in real-time that is not affected from case to case by a human's (or many humans') biases, education, training, etc.

It is further desirable to have a scalable process and system for determining an entity's continuous identity in real-time that does not suffer from many of the inefficiencies introduced through the use of known systems by humans.

It is further desirable to have an explainable process and system for determining an entity's continuous identity in real-time that does not rely upon the vagaries of decision making in a less logical environment.

The above-described deficiencies are merely intended to provide an overview of some of the problems of conventional systems and methods and are not intended to be exhaustive. Other problems with conventional systems and corresponding benefits of the various non-limiting embodiments described herein may become further apparent upon review of the following description.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later. The embodiments set forth below are intended to be non-limiting except where such embodiments describe the only manners of achieving the inventive systems and methods.

It is an objective of the inventive systems and methods to provide reliably repeatable processes and systems for determining an entity's continuous identity in real-time. Such reliably repeatable nature may be derived in part from using the logical processes set forth herein, rather than over-reliance on the logically fallible processes of the human mind.

It is a further objective of the inventive systems and methods to provide objective processes and systems for determining an entity's continuous identity in real-time. Such objectivity may be derived from moving away from processes and systems that rely overly-much on a human's (or many humans') biases, education, training, etc., which may result in non-objective determinations over the course of evaluating a few or many identity inquiries.

It is a further objective of the inventive systems and methods to provide scalable processes and systems for determining an entity's continuous identity in real-time. Human labors do not scale well and often scale in an asymptotic manner that approaches a limit based upon the amount of scaling. However, the systems and methods described herein generally scale linearly or substantially linearly in their capabilities to handle additional identity inquires, and do not generally approach a limit within practical reason. That is, the ability to scale substantially linearly often appears to be almost limitless within the quantity of inquiries that may be needed or used. Such systems and methods do not suffer from many of the inefficiencies introduced through the use of known systems by humans. They can be scaled linearly or substantially linearly within a particular time. That is, if the number of resources and quantity of queries are increased at a 1:1 ratio, then the systems and methods can scale linearly or substantially linearly over time, as opposed to the asymptotic scaling encountered when humans are heavily involved.

It is a further objective of the inventive systems and methods to provide explainable processes and systems for determining an entity's continuous identity in real-time. Such systems and methods can provide a set of objective parameters that can be verified by using the same parameters on differing data to test the objectivity. Such objective and explainable processes and systems do not rely upon the vagaries of decision making in a less logical environment. For example, while two humans may be asked to write a description of the decision process used in making a complex decision, it will often be seen that (even in circumstances where both reach the same decision) the explanation of the process employed will vary from decision to decision. The precision level with which the inventive decision-making process can be explained is at a level that humans are not known to be able to accomplish nor approach.

The inventive concepts set forth herein may be realized in various forms including systems, methods and computer-readable media.

In an embodiment, the determination of a continuous identity in real-time may use a machine learning algorithm where a request to verify the identity of an individual is sent or received at a first time over a computer network. Such a request can include one or more partial identifiers. In conjunction with this, a database storing identification credentials for multiple people or entities can be accessed. (In the following description, the term "entities" can be taken to refer to people or to other types of living, legal, or other entities that might need identification, such as companies, automobiles, etc.) Preferably the database will be large, but could also be a database storing information for a limited number of entities. Different types of identification credentials may be stored and accessed within the first database for different individuals in the group of entities. And certain types of identification credentials may include various types of information the do not overlap for a particular entity or that do not overlap among different entities. It is also expected that the database may include identification credentials that are expired for one or more entities and identification credentials that are not expired for one or more entities. A second database (or table(s) or organizational structures within the first database) may store information regarding the strength of relationships between the various identification credentials stored in the first database. A machine learning algorithm can be applied to the partial identifiers, the identification credentials, and the strengths of relationships. The machine learning algorithm may determine whether the identity of an entity can be verified, refuted, or neither. The machine learning algorithm may establish and apply weights to various of the relationships based upon training, feedback, and searching. And the machine learning algorithm may apply a tunable risk tolerance to the determination. After a determination is made, the system may transmit a response to the request to verify the identity. In such a system, it is desirable that the rate at which the machine learning algorithm processes a plurality of individuals scales substantially linearly over time with application of an equal number of resources and requests to verify.

In certain embodiments, it may be desirable to periodically update the first database to store further identification credentials for individuals. After this update is made (or simultaneous with it), it is desirable to update the second database to add or modify one or more relationship strengths based upon the further identification credentials stored during the update. And it may be further desirable to again apply the machine learning algorithm to the partial identifiers, the identification credentials, and the strengths of relationships, to update the determination of whether the identity of the individual can be verified, refuted, or neither.

In certain embodiments, it is desirable to provide a precise explanation of objective parameters used by the machine learning algorithm to determine whether the identity of the individual can be verified, refuted, or neither.

In some embodiments, the request to verify the identity of an individual may include an indication of risk tolerance for use by the machine learning algorithm.

In some embodiments, it may be desirable to receive over the computer network another request that seeks to verify the identity of a second individual. Such a request may include a second set of partial identifiers and a second indication of risk tolerance that the machine learning algorithm may use. In such circumstances, it is desirable that the machine learning algorithm be capable of applying different risk tolerances for different requests. In such an embodiment, it is desirable to apply the machine learning algorithm to the second set of partial identifiers, the identification credentials, the strengths of relationships, and the second indication of risk tolerance, to determine whether the identity of the individual can be verified, refuted, or neither.

In other embodiments, it is desirable that the request to verify the identity of an individual include an indication of the required minimum level of the strength of relationships between the identification credentials that will be used by the machine learning algorithm.

In yet other embodiments, it is desirable to assign an authoritative status to one or more of the plurality of identification credentials stored in the first database.

In addition, further embodiments are directed to other exemplary methods, and associated systems, devices and/or other articles of manufacture that facilitate continuous identity verification, as further detailed herein.

These and other features of the disclosed subject matter are described in more detail below.

BRIEF DESCRIPTION OF THE DRAWINGS

The devices, components, systems, and methods of the disclosed subject matter are further described with reference to the accompanying drawings in which.

DETAILED DESCRIPTION OF ILLUSTRATIVE EMBODIMENTS

As described above, conventional processes for handling user information and/or solutions for misuse or potential misuse provide some measure of security, user control, and/or rectification for data breaches, such efforts fail to provide meaningful solutions for increased user control and/or security of user information, and/or are subject to further costs or drawbacks, etc., among other deficiencies.

Figure 1:
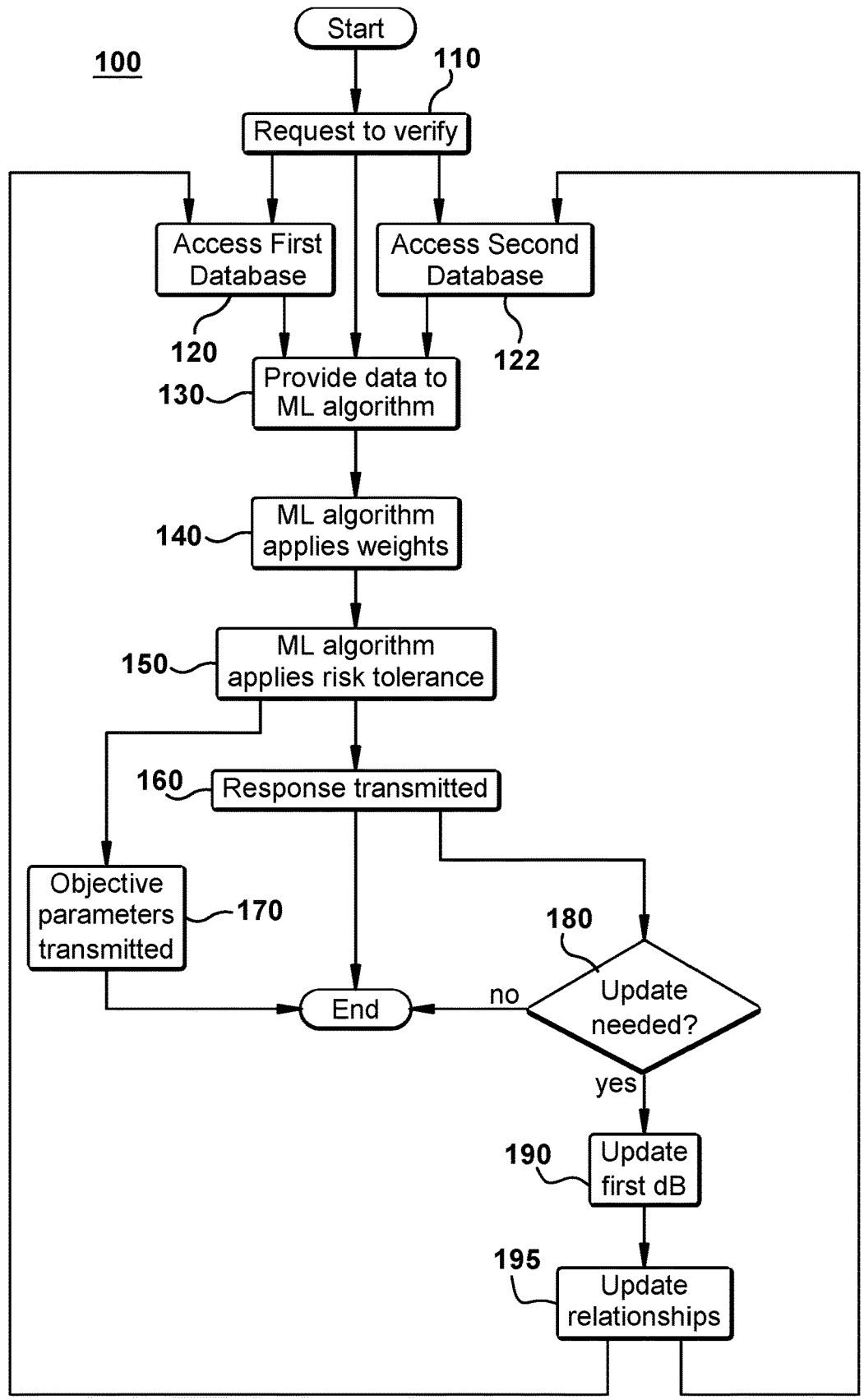
FIG. 1 is an illustrative process for management and curation of continuous identity.

FIG. 1 depicts a simplified flow chart of method 100 of an embodiment of the inventions set for the herein for determining continuous identity in real-time. A real-time determination, rather than a determination that takes hours, days, or weeks is often necessary and desirable in various applications. In an airport security station, it may be necessary to determine identity within seconds. In an online loan application process, it may be necessary to determine identity within minutes. In a passport application process, it may be necessary to determine identity within days. And in a job application process, it may be necessary to determine identity within weeks. Each of these is exemplary only, and different processes may have different real-time requirements.

As the process starts and proceeds to step 110, in step 110 the inventive system may receive a request to verify the identity of an individual. The request will include a plurality of partial identifiers from which the system is asked to make a determination. Such partial identifiers might include some combination of name, address, birth date, identification number, references, biometric data, or any of the various types of data set forth below in the discussion of FIG. 2. The request may be transmitted by a user of an application program on a mobile device, by a user of a web browser on a computer, by an automated process being executed by another system, or in many other manners. Without some provision of partial identifiers though, processing the request will be largely impossible, so at least some partial identifiers (whether weak or strong) are required.

In steps 120 and 122, the process accesses two databases. Such databases may be stored on separate servers, stored on the same server, distributed widely or maintained securely. The databases may be accessed serially or in parallel. It may be necessary to access a number of databases that house various types of data set forth in FIG. 2. For ease of reference, the database of step 120 can be considered to be a database (or group of databases) storing various types of identification credentials for numerous different individuals. In some instances, this might be an employee database, in some instances a prisoner database, in some instances a voter database, in some instances a government identification database, in some instances a retail store's database of customers, etc. The database of step 120 may contain multiple types of identification credentials from a single category of credential or from multiple categories of credentials (as set forth in FIG. 2). It is possible that the types of data partially or fully overlap for various persons, such as a collection of driver's licenses, social security cards, passports, and birth certificates for numerous people, or that the types of data do not overlap for various persons, such as driver's licenses for some persons, passports for other persons, and birth certificates for yet another group of persons. Some such credentials may be old or expired, such as a birth certificate or an old driver's license, while other credentials may be current, such as a season ski pass, a student identification, or a current driver's license. In some databases, various types of credentials for a particular person might not overlap such as a social security card bearing name, signature, and social security number for one person, versus a photo of Mr. Schutte's third grade class that shows the school's name, year, and pictures that might be used to identify students. While the two types of credentials identified in the preceding paragraph might not have any overlapping data that would allow a direct match, it might be possible to establish a relationship between the two with a third credential (such as a school yearbook) that showed a list of students in Mr. Schutte's third grade class and that contained the name that appears on the social security card, or possibly a photo from a newspaper article that shows one of the students from the class photograph with the name that appears on the social security card. Thus, it may be possible or necessary to trace an identity request from one credential to another through one or more additional credentials. As noted herein with respect to an example discussing a severed finger, it may be necessary to trace a path through and establish relationships between several types of credentials to confirm an identity.

Turning to step 122, in this step another database is accessed that stores information regarding the strength of relationships between credentials. The database may be organized in a manner that the strength of relationships with respect to individual pieces of data in different credentials is retained. Alternatively, it may retain data with respect to the strength of relationships of different credentials without regard to individual data points within the credentials. Alternatively, it may be maintained as a combination of such information. The strengths of relationships are preferably assigned by a machine learning algorithm that operates on the data to be used in step 120 and creates or modifies strengths of relationships after having been trained with an appropriate set of training data, such as that represented in database 510. As one of ordinary skill will appreciate, the training data is preferably varied with respect to various types of data that may be retrieved, such as photos, fingerprints, credit reports, account statements, passports, biometric data, and other relevant data. One of skill will recognize that a machine learning system 514 trained 530 solely on credit reports will likely underperform when asked to compare photographs to determine identity, a machine learning system 514 trained 530 solely on photographs will likely underperform when asked to compare account statements to determine identity, and so on. Proper training (and possibly retraining) will be essential to establish the weighted parameters used by a machine learning algorithm. One or more standardized sets of training data and training routines may be prepared and maintained so that audits and resets may be made possible in a standardized manner. It may be desirable to allow the machine learning system 514 to continue learning from inquiry data received outside of the training data; but in some systems where accountability, accuracy, and explainability are highly valued, it may be desirable to only allow training with a standardized data set.

In step 130, the data retrieved in steps 120 and 122 is provided to the machine learning algorithm 514 with the identity inquiry received in step 110. If the data is acceptable, the method proceeds to step 140.

In step 140, the machine learning system 514 applies at least one suitable trained model 530 using a parallel computing architecture 540 to assess the data provided, including the inquiry, the partial identity identifiers, the retrieved identification credentials, and the retrieved relationship strengths, to attempt to determine a response to the inquiry. Preferably the machine learning system 514 will apply the weights in its model that were determined by training and obtain a result indicating whether an identity can be verified, refuted, or neither. As noted above, it is possible that training of the algorithm may continue in certain embodiments even during use. In such embodiments, it may be desirable to provide a user interface from which a human user can provide an assessment of whether the obtained result was correct or incorrect, or possibly ambiguous as to correctness. Alternatively, a separate assessment by a different machine learning system may (not illustrated) may be obtained to assess whether the result was correct, incorrect, or ambiguous. Such feedback alone or coupled with internal feedback based on ongoing training may be used to enhance the reliability of the weights within the trained model. The method then proceeds to optional step 150. In certain embodiments, it may be desirable to receive an indication of the minimum strength of certain relationships that will be needed to verify an identity based on certain types of credentials. Similarly, it might be desirable to allow the user or system making the inquiry to assign authoritative status to one or more credentials. For example, a fingerprint record or passport might be deemed to be an authoritative indicator of identity in certain circumstances, whereas a receipt from a retail store, a photograph, or a library card might be deemed to be a less certain indicator of identity that can contribute to a determination without being authoritative.

In optional step 150, used in certain embodiments of the method, a risk tolerance may be applied to the determination based on the specific needs of the inquiry that has been posed or the specific needs of the user or system posing the inquiry. For example, in a situation where an identity inquiry is being made to determine whether to make a short-term loan for $50, the risk tolerance might allow for less certainty than in a situation where an identity inquiry is being made to determine whether evidence shows that an unidentified corpse belongs to a particular person. In one of the exemplary circumstances, the risk of a false positive or false negative is much lower than in the other circumstance. Because various types of users or systems may need to make inquiries of the inventive methods and systems, it may be desirable in some embodiments to provide a variety of risk tolerances that can be tuned for each inquiry or even within an inquiry. For example, a customs agency in one country might give higher weight to a passport from a stable country and lesser weight to a passport from an instable country, while assigning less weight to confirmatory evidence in one situation than in another. And another country's customs agency might provide the opposite weighting if that country is allied with the instable country and in a conflict with the stable country. Thus, it can be seen that in some embodiments it will be desirable to allow for tunable risk tolerances that can be specific to a particular use case, that can focus on certain data, or that can be a general overall risk tolerance. It may also be desirable to allow for tuning of some portion or all of the risk tolerance for each inquiry or for the stable application of a single risk tolerance across numerous applications. As an example of this, images captured from a CCTV camera during daylight might pose a lower risk of false identification due to adequate lighting while images captured from a CCTV camera at night might pose a higher risk of false identification. Thus, it might be desirable to allow a user to tune risk at various times of the day or even to set a pre-programmed risk tolerance that may automatically change at certain times, on certain days, or in other pre-set manners. In certain embodiments, it may be desirable to receive risk tolerance information with the request that is received in step 110. In such embodiments, it may be desirable to have the capability to receive and apply a different risk tolerance with each new inquiry.

Following step 150, the method preferably proceeds to steps 160 and 170. In step 160, the response to the inquiry may be transmitted to the entity that made the request, such as user device 502 or automated system 503. Alternatively, depending on the purpose of the inquiry, the response may be transmitted to a different system or entity rather than returned to the original entity that made the inquiry. If the method is one in which an explainable result is desirable or required, in step 170, the machine learning system 514 may transmit a precise explanation of the objective parameters that it used to determine whether the identity can be verified, refuted, or neither. Such an explanation may be important to avoid claims of bias or discrimination. Or the explanation may be important if the determination is to be used in evidence or as justification for taking an action. Such an explanation might be important for a business to maintain documentation of its practices. The level of detail of the precise explanation may vary depending on the particular application. And it may be desirable to provide a user interface or API in which the desirability of a precise explanation can be set and the level of detail of the explanation can be set.

In systems used to perform the method set forth in FIG. 1, it is desirable to construct the systems in a manner in which the rate at which the machine learning system 514 processes several inquiries can scale substantially linearly over time when new computing resources are added at the same ratio as the number of requests for verification. This provides a substantial advantage for a system in which numerous inquiries might be processed.

After step 160 is completed, in some embodiments it will be desirable to determine (step 180) whether a database update is needed or desired. If no database update is needed or desired, the method may be terminated for the instant inquiry. If a database update is needed or desired, the method may proceed to step 190. In step 190, the database(s) of credentials may be updated to include new data or remove data that is no longer deemed useful. In conjunction with the update, either after the update or during the update, it may then become necessary to update the relationships in the second database that were accessed in step 122. Upon updating the relationships, the method may proceed through nodes (a) and (b) to steps 120 and 122, respectively. At that point, the method may resume as set forth above while using the updated data to process either the previously processed inquiry or a new inquiry. Such updates to the databases in steps 190 and 195 may be performed at a regular interval, upon receipt of an indication that new data is available, or according to another parameter that is relevant to the entity or system using the method to process inquiries.

In some embodiments of the inventions, it may be desirable to require that step 160 be completed no less than two minutes after step 110. In other embodiments, such as a verification of an internet form, it might be desirable to require that step 160 be completed no less than ten seconds after step 110. In other embodiments, a longer period might be acceptable but will often remain a shorter period than that in which a human could search the relevant data, assess the strengths of the relationships between credentials and provide a precisely explainable determination.

Figure 2:
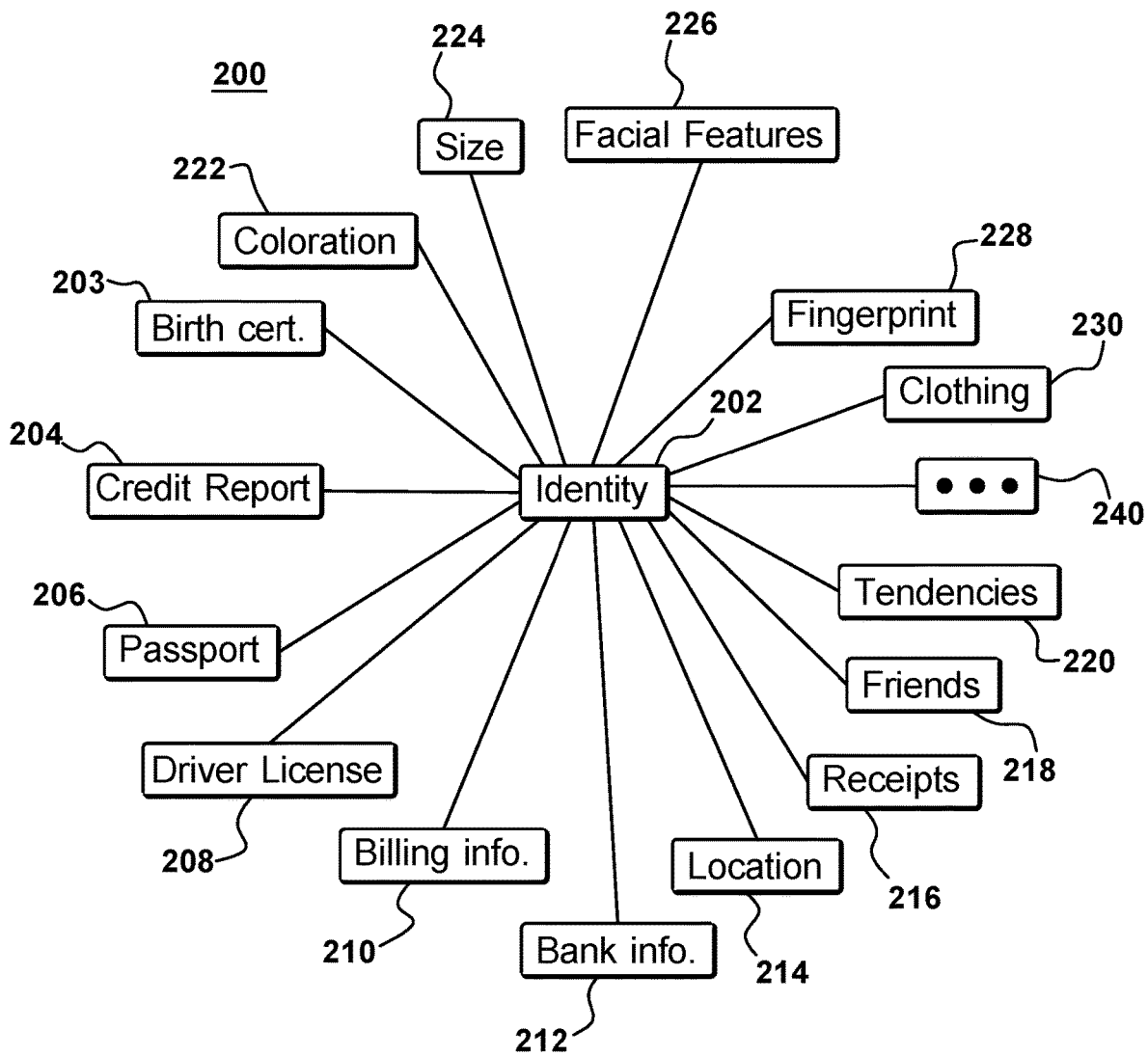
FIG. 2 is a block diagram of illustrative components that comprise components of identity.

FIG. 2 is a block diagram 200 of components 203 through 240 that comprise data relating to an identity 202 in accordance with certain embodiments of the present disclosure. The identity 202 may comprise data relating to a birth certificate 203, a credit report 204, a passport 206, a driver's license 208, billing information 210, banking information 212, location 214, receipts 216, friends (or social networks) 218, tendencies 220, coloration 222, size 224, facial features 226, fingerprints 228, clothing 230, and/or numerous other data sources represented by 240. Some portion or all of the components 203 through 240 may be retrieved either locally or through a suitable network connection from one or more data sources (e.g., databases db1 through dbn in data store 508). It will be understood that components 203 through 240 are provided for illustrative purposes only and that the identity described herein may comprise more or fewer components than components 203 through 240 provided in FIG. 4. For example, a young person's identity may include a birth certificate 203, coloration 222, size 224, facial features 226, and fingerprints 228, but may be devoid of other components such as driver's license 208, passport 206, receipts 216, etc. that might be expected of an older person. As another example, a corporation's identity might include bank information 212, receipts 216, billing information 210, and location 214, but might be devoid of information that a natural person might possess including driver's license 208, facial features 226, fingerprints 228, clothing 230, etc. The following descriptions of identity data that may be found within certain components is intended to be exemplary and not exhaustive. One of ordinary skill will recognize that such data may vary between various entities, countries, eras, etc. For example, passport data varies by country, by the type of passport, by the year in which the passport was issued, and by other factors that cannot all be captured in this disclosure. The same is true for many of the identity components.

Birth certificate component 203 may include data such as birth date, location, time, parents' names, given name, surname, hospital name, length and weight at birth, biological sex, race, etc.

Credit report component 204 may include given name, surname, tax identification number, known present and past addresses, various banking and account data including loans, payments, regularly of payments, amounts owed, and various other payment and debt information.

Passport component 206 may include a photograph, given name, surname, address, signature, passport number, country of origin, country of residence, additional details regarding residence location, birth date, issue and expiration date, biological sex, height at issuance, weight at issuance, hair color, eye color, and various other details. One can expect that it is likely that passport component 206 and birth certificate 203 for a single person might record the same given name, surname, birthdate, biological sex, and certain other details, but that it is highly likely that weight and height will vary between the two sources and possibly even between various instances of passport data for the same person.

Driver's license component 208 may include much of the same type of information as passport component 206, but that a driver's license might indicate an issuing province or state rather than country, one or more classes of vehicles that the driver is authorized to drive, the date at which the driver may reach 21 years of age, and other data relevant to driver's licenses. For a single individual, when the passport component 206 and driver's license component 208 are compared, the photographs may vary, height and weight may vary, hair color may vary, and other details may vary, while one would expect the birthdate, biological sex, and names would often (but not always) match.

Billing information component 210 might include information about bills that were received, bills that were paid, bills that were unpaid, amounts of payments, dates of payments, whether payments were timely, whether monies remain owed, account numbers, given name and surname of a person to whom the bill was sent, mailing address, purpose of the bills, and other relevant information.

Banking information component 212 might include the names of banks, account numbers, withdrawal and deposition information, debits, credits, checking information (check numbers, amounts, payees, dates, etc.), transfers, taxpayer identification numbers, mailing addresses, payee and payor names (and other data), and various other data collected by banks.

Location component 214 might include past and present residence information, past and present travel information, location tracking information that ties location to specific dates and times, frequency of visiting particular locations, travel or visitation pattern information, and other location related information.

Receipt component 216 might include data related to receipts for various purchases or sales, including dates, item(s) purchased or sold, times, amounts, partial or complete account numbers, partial or complete numbers of accounts related to payment methods, location of sale or purchase, information regarding frequency of purchases or rewards account information, purpose of purchase, given name and surname of purchaser and/or seller, tax information, tipping information, and/or other information associated with receipts.

Friend component 218 might include information collected from social networking services, names of friends, lengths of friendships, closeness of friendships, interaction date (e.g., frequency, dates, lengths, etc.), types of friendships (e.g., romantic, platonic, professional, etc.), and various other data related to friendships. Friendships might be formed, dissolved, formed again, changed in strength, etc.

Tendencies component 220 might include information regarding an entities tendencies that can be extremely varied, such as preferences, habits, exhibited behaviors, and various information related to tendencies.

Coloration component 222 might include skin color, hair color, eye color, or coloration of other features. One might expect that after the first few years of life that eye color will remain very similar, but that hair color might change significantly over time. For example, a person might be born with blonde hair, which might change to brown, which might be colored with dyes at various times, which might eventually turn grey, which might later turn white, such that the same person over time might have an extreme variation in hair color but might have the same eye color throughout.

Size component 224 might include data related to height, weight, shoe size, waist size, shirt size, inseam, and numerous other body measurements. Certain portions of size component 224 can be expected to change significantly, whereas in adulthood, certain components such as height and shoe size often remain very stable over time.

Facial features component 226 might include various facial measurements, eye color, lip color, dental records, skin tone, relationships in placement between eyes, nose, mouth, chin, eyebrows, ears, etc., details regarding facial hair, and many other facial features.

Fingerprint component 228 might include fingerprint data for various fingers, handprints, footprints, etc. that were taken at various times and using various methods. The fingerprint data is likely to be associated with other data such as given name, surname, date of birth or age, address information, or other information. One might expect fingerprint data to undergo certain changes over time if scars are formed on fingertips, if fingers are amputated, or as the skin stretches or wrinkles with age.

Clothing component 230 might include data related to sizing, types of clothing, frequency of purchases, preferred brands and styles, and other data that reflects clothing that might be worn by a person. It is expected that portions of clothing data will vary significantly over time in younger persons as they grow and as styles change, but that elderly persons will show less change in data as many adhere to known types and sizes of clothing rather than following fashion and have stopped growing.

Box 240 generically represents a potentially large amount of other identity data. For example, such data might include tattoo data, affiliation data, genealogy data, gene sequencing data, political and voting data, and many other potential sources of identity data.

Many of the above listed components 203 through 240 of identity might vary significantly over time for any given entity. While it is expected that certain data points are likely to remain unchanged, it is also expected that other data points are likely to remain static or slightly changed. Some data might gradually vary while other data might abruptly change. For example, a person's height and weight are expected to continually and significantly increase between ages 1 and 18, followed by a more gradual or non-existent change in height over the next 40 years while weight may fluctuate upwards and downward with events including pregnancy or changes in exercise routines. In some cultures, it is expected that a man's name might not change over his lifetime but that a woman's name may experience an abrupt change with a marriage or divorce, while in other cultures a man's name might change with marriage or divorce. Many other types of changes in identity information are to be expected over time.

Figure 3:
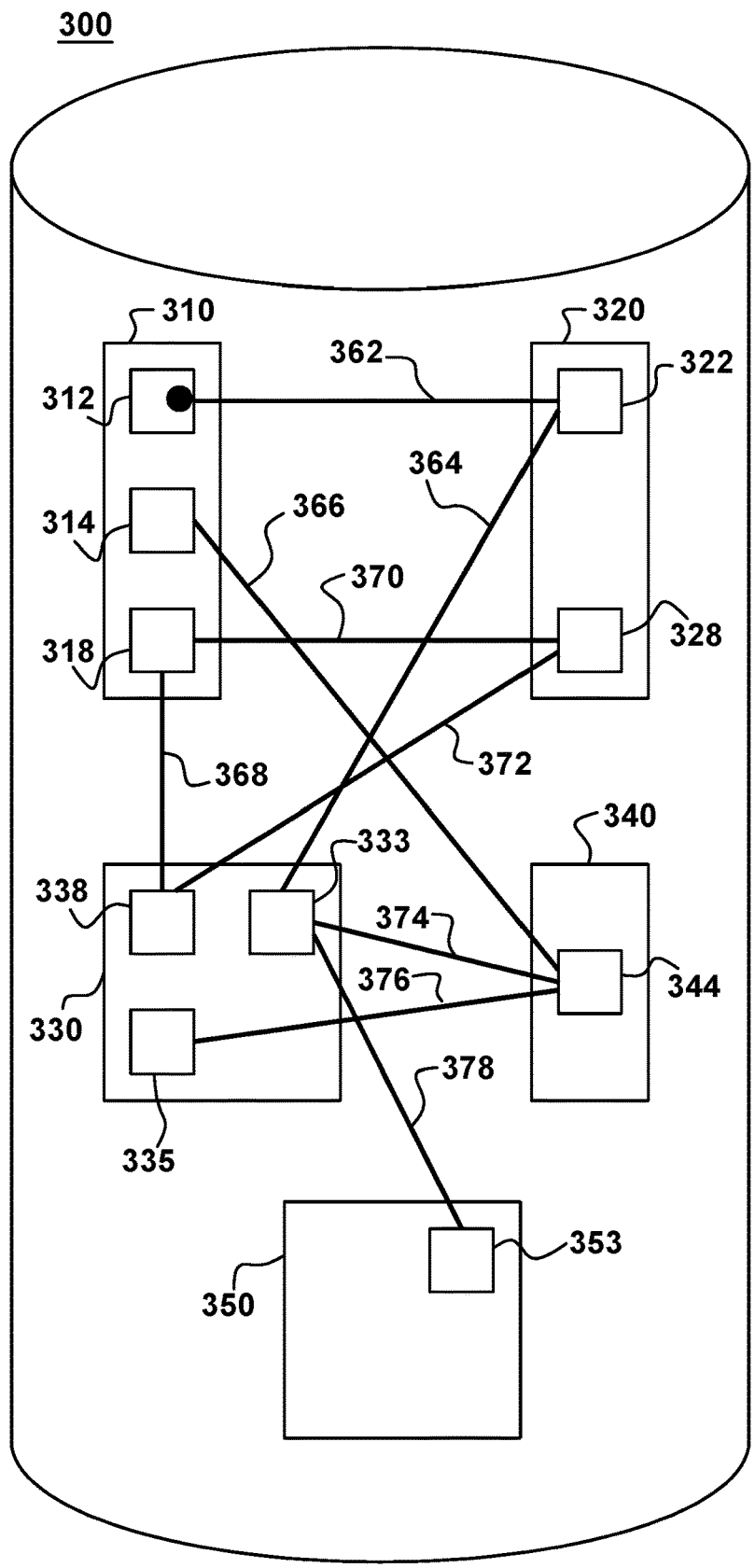
FIG. 3 is a block diagram illustrating varying data that may be stored in a database related to management and curation of continuous identity.

FIG. 3 depicts a block diagram representing an exemplary database 300 that might be used in certain embodiments of the inventions disclosed herein. Database 300 might include data regarding various identification credentials 310, 320, 330, 340, and 350. As represented visually, the credentials are given different shapes to signify different types of data. And the shapes withing the various credentials are placed at different locations to visually indicate potential different types of data. It should be noted that one of ordinary skill in the art will understand that such data is usually not represented as shapes within databases, but that providing an example such shapes can assist with comprehension.

FIG. 3 contains three rectangular-shaped credentials 310, 320, and 340, which have positions for up to four subsets of data within each. Credential 310 has data 312 in the first position, data 314 in the second position, no data in the third position, and data 318 in the fourth position. Credential 320 has data 322 in the first position, no data in the second and third positions, and data 328 in the fourth position. Credential 340 has data 344 in the second position and no data in the first, third, and fourth positions. Credentials 330 and 350 are roughly square-shaped to represent a second type of credential. Credential 330 has data 328 in its first position, data 333 in its second position, data 335 in its third position, and no data in its fourth position. Credential 350 has data 353 in its second position and no data in its first, third, and fourth positions.

As one example of what this data might represent, credentials 310, 320, and 340 might represent various government issued identification cards or licenses while credentials 330 and 350 might represent various financial data. In this example, it is possible that credential 310 represents a passport with data 312 representing a surname, data 314 representing a full government identification number (such as a social security number in the United States), and data 318 representing a birth date. Credential 320 might represent a driver's license with data 322 representing a surname and portions of an identification number, and data 328 representing a birth date. Credential 340 might represent a benefits card with data 344 representing a full id number. Credential 330 might represent a credit report with data 338 representing a birth date, data 333 representing a partial identification number (such as the last four digits of a social security number), and data 335 representing a full identification number. Credential 350 might represent a receipt from a purchase with data 353 representing a partial identification number; for example, it might contain the last four digits of a social security number.

Various portions of these data may bear relation to one another, and the relationships may be of varying strength. Such relationships are represented visually by the interconnecting lines 362, 364, 366, 368, 370, 372, 374, 376, 378 shown in FIG. 3. These interconnecting lines are a visual representation of data that may be stored in a relationship database that stores the strength of relationships. That relationship database is not visually depicted in FIG. 3, but may be represented as one of databases db1 through dbn depicted elsewhere in this disclosure. Where the relationships are strong or non-contestable, the second database may store data indicating a strong relationship. And where the relationships are weak or contestable, the second database may store data indicating a weak relationship. For each such relationship, the second database might store an indication of each related credential, an indication of the reason for the relationship, and an indication of the strength of the relationship. One of ordinary skill will understand that there are many ways to store and index such data that will be acceptable for various implementations of the embodiments of the disclosed inventions.

As an example of potential relationships that might be represented in FIG. 3, in the United States, social security numbers are intended to be unique nine-digit numbers. Thus, if two data points 314 and 344 contain the same nine-digit social security number, the relationship between the two credentials 310 and 340 would be very strong. However, there are many social security numbers that might contain the same last four digits. Thus, while the partial identification number represented as 333 and the full identification number represented as 344 might appear to match, the relationship will not be as strong as the match of two full identification numbers. And it is possible that many people bear the same surname or even a combination of given name and surname. So, while the surname represented as 310 might match the surname represented as part of 320, forming a relationship, that relationship will not be as strong as the match between two full identification numbers. Further, while individual data points within credentials might form a portion of a match, the combination of multiple data points might lead to a stronger match. For example, credential 310 and credential 320 might have additional strength in their relationship because, in addition to the surname match discussed above, both may have the same birthdate represented as data points 318 and 328, leading to a closer (or stronger) relationship between 310 and 320 than would be provided merely by surname alone.

As set forth in FIG. 3, lines 362 and 370 may represent the relationship between credentials 310 and 320, and may be used individually or in combination. It may be desirable to tie the relationships to specific data items such as 312 to 322 and 318 to 328, respectively. Or it may be desirable to more generally tie the relationships to the credentials alone. In some implementations, it may be desirable to tie the relationships to both the credentials and the specific data points associated with the credentials. As noted above, data 312 might represent a surname and might have a strong relationship with data 322 representing a combination of a surname and portions of an identification number. Similarly, data 333 might represent a partial identification number and have a strong relationship with data 320. But in such a case, data 333 representing a number and data 312 representing a name might not have any direct relationship. So evaluation of the relationship might need to pass through credential 320. For example, if one could determine with certainty that both credentials 310 and 320 were related to the same person and determine with certainty that both credentials 320 and 330 were related to the same person, one could logically determine that credentials 310 and 330 were related to the same person. But if any absence of certainty existed in either of or both relationships 362 and 364, then an uncertainty in relationship between credentials 310 and 330 would also exist.

Relationships 368, 370, and 372 link credentials 310, 320, and 330 and data 318, 328, and 338. As noted above, if each of data 318, 328, and 338 represent a birth date, it will be possible to suggest a relationship when the birth dates match. However, because more than one person has been born on every birth date in the past 200 years, it is not possible to determine a unique identity based on birthdate alone. So the relationship strength of 368, 370, and 372 may have some intermediate value. It may be necessary to consider additional information in each credential to make a more certain determination of identity.

Relationships 366, 374, and 376 link credentials 310, 330, and 340, and data 314, 344, 333, and 335. As noted, data 333 might represent a partial identification number and data 335 might represent a full identification number, while data 314 and data 344 might represent a full identification number. In the event that such a number is unique, relationships 366 and 376 might represent definitive ties between credentials 310, 330, and 340. But where the number is not unique, relationships 366 and 376 might have a weaker strength. Relationship 374 might represent a relationship between a partial identification number in data 333 and a full identification number in 344. Where relationship 376 exists and is definitive, then relationship 374 might be less useful. But if data 335 is lost or altered, then the existence of relationship 374 may gain increased importance as a link between credentials 330 and 340. Relationship 378 may link credentials 330 and 350 and data 333 and 353. For example, in the example wherein credential 350 represents a receipt for a purchase and the relevant person was required to enter a partial identification number to verify the transaction, credential 350 might store that partial identification number for future verification purposes as data 353. In such instances, determination of relationship 378 between data 333 and 353 may be possible. The strength of 378 may be weak; but if other relationships are found between data in credential 378 and other credentials, such findings may provide a stronger relationship link between credential 378 or data 353 and other credentials or data.

Figure 4:
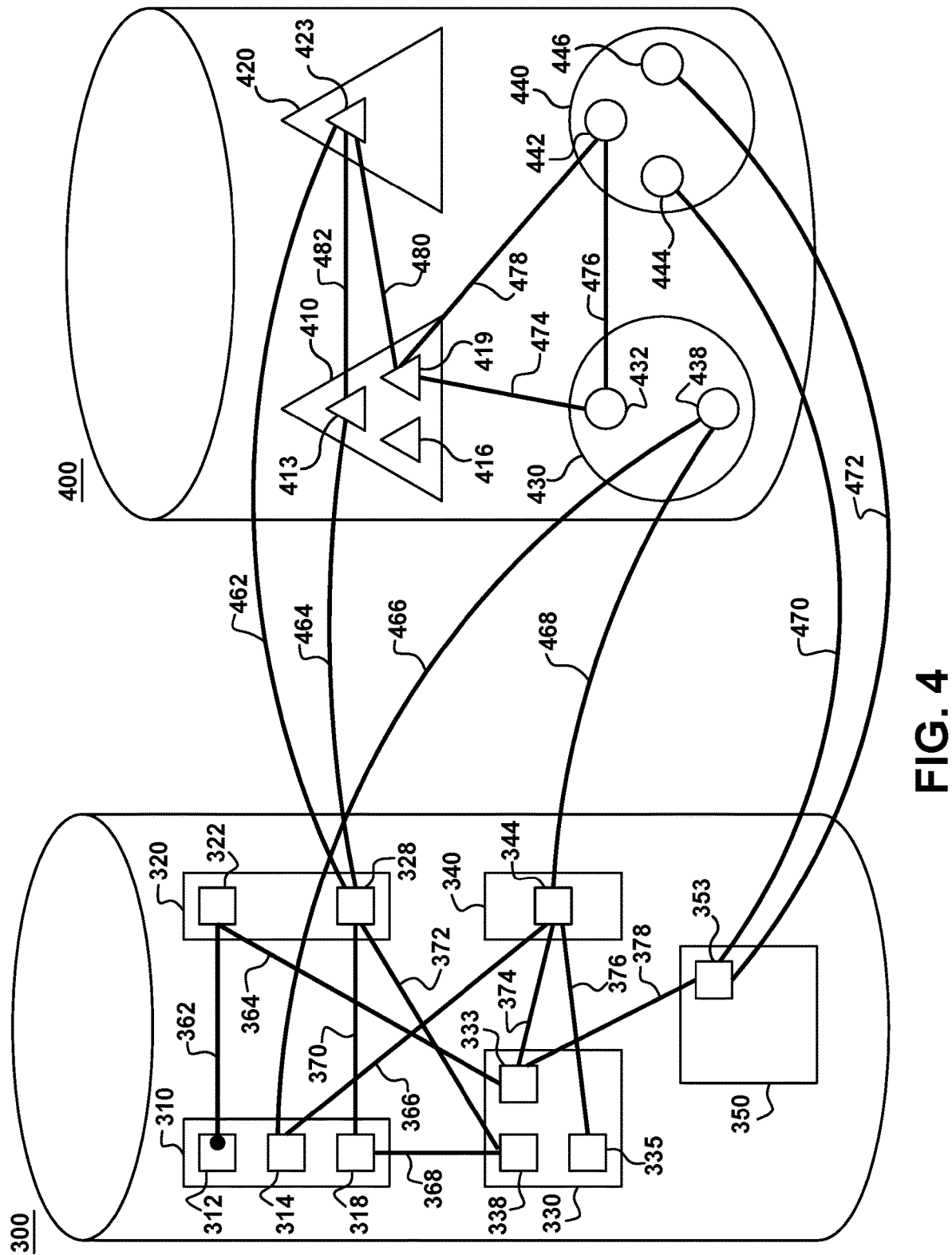
FIG. 4 is a block diagram illustrating varying data that may be stored in a plurality of databases related to management and curation of continuous identity.

FIG. 4 builds on the disclosure of FIG. 3 and depicts a block diagram representing a second exemplary database 400 that might be used in certain embodiments of the inventions disclosed herein. Database 400 might include data regarding two additional types of identification credentials labeled as 410, 420, 430, and 440. As represented visually, the credentials are given different shapes to signify different types of data both internally and as between databases 300 and 400. And the shapes within the various credentials are placed at different locations to visually indicate potential different types of data. It should be again noted that one of ordinary skill in the art will understand that such data is usually not represented as shapes within databases, but that providing an example such shapes can assist with comprehension.

FIG. 4 contains two triangular credentials 410 and 420, which have positions for up to four subsets of data within each. Credential 410 has data 413 in the upper position, data 416 in the lower-left position, no data in the central position, and data 419 in the lower-right position. Credential 420 has data 423 in the upper position and no data in the other three positions. Credentials 430 and 440 are roughly circular to represent a fourth type of credential. Credential 430 has data 432 and 438 in its upper and lower positions, respectively, and no data in left or right positions. Credential 440 has data 442 in its upper position, data 444 and 446 in its left and right positions, respectively, and no data in its lower position.

As one example of what this data might represent, 410 and 420 might represent various personal identification credentials while credentials 430 and 440 might represent educational credentials. In this example, it is possible that credential 410 represents an elementary school identification card with data 413 representing an age, data 416 representing the school's name, and data 419 representing the grade. Credential 420 might represent a fingerprinting record with data 420 representing a birthdate. Credential 430 might represent a high school graduation credential (such as a transcript or diploma) with data 432 representing the graduation date and data 438 representing an identification number. Credential 440 might represent a college graduation credential with data 442 representing a graduation date, data 444 representing a partial identification number, and data 446 representing an email address that might incorporate part of the identification number.

Various portions of these data may bear relation to one another and/or to data in database 300 and the relationships may be of varying strength. Such relationships are represented visually by the interconnecting lines 462, 464, 466, 468, 470, 472, 474, 476, 478, 480, and 482 shown in FIG. 4. These interconnecting lines are a visual representation of data that may be stored in a relationship database that stores the strength of relationships. That relationship database is not visually depicted in FIG. 4, but may be represented as one of databases db1 through dbn depicted elsewhere in this disclosure. Where the relationships are strong or non-contestable, the second database may store data indicating a strong relationship. And where the relationships are weak or contestable, the second database may store data indicating a weak relationship. For each such relationship, the second database might store an indication of each related credential, an indication of the reason for the relationship, and an indication of the strength of the relationship. One of ordinary skill will understand that there are many ways to store and index such data that will be acceptable for various implementations of the embodiments of the disclosed inventions.

As an example of potential relationships that might be represented in FIG. 4, various educational documents may relate to one another over time, such that a person who finishes first grade in a certain year might be predicted to graduate from high school eleven years later and college approximately four years later. Thus, if three data points 419, 432, and 442 all contain data related to grade level or commencement in various years, they might have a relationship to the same person. For example, grade level at a certain time that is stored in data 419 might bear a relationship to a high school graduation year stored in data 432 and a college graduation stored in data 442. Because the length of time required to complete a college course of study often varies more than the length of time required to complete high school, relationship 474 is likely to be stronger than relationship 478 or relationship 476. But each of these relationships might be considered relatively weak unless combined with other identity data in the credentials due to the fact that many people graduate each year rendering a graduation year a relatively weak identifier. However, a graduation year coupled with a photo, name, and email address might provide a much stronger possibility of an identity confirmation or rejection.

As part of this example, an age represented as data 413 might have a strong relationship to the birthdate provided as data 423 and data 328, meaning that relationships 462, 464, and 482 might be stronger than relationships 474, 476, and 478. Even within this hierarchy, relationship 462 might be the strongest with an exact birthdate match, while relationships 464 and 482 are each matching a birthdate to an age, which is not as strong of a relationship. It may also be possible to match the birthdate in data 423 to a school grade level in data 419 as depicted in relationship 480, though such a match would be relatively weak due to many children with a particular birth date being found within a specific grade level.

In the example, relationships 466 and 468 depict the ability to establish relationships between data across databases, such as the identification number in data 438, 314, and 344. Because these three data points represent full identification numbers, they might be used to determine the existence of strong or definitive relationships between credentials 310, 430, and 340. If the identification number is unique, a definitive relationship might be established. Whereas if the identification number is not unique, relationships 466 and 468 will be strong, but not definitive. Similarly, relationships 470 and 472 represent the potential relationships between a partial identification number in data 444, an email address containing a partial identification number in data 446, and a partial identification number in data 353. In this instance, it might be possible to match different parts of the partial identification number in data 353 to each of the various numbers in data 444 and 446.

As will be recognized, the examples described above and depicted in FIGS. 3 and 4 are simplified for ease of understanding and to avoid overly cluttered FIGS. It will be understood that any of the credentials identified above is likely to have many more pieces of data, some of which might form definitive relationships with other credentials and some of which might form weaker relationships individually but might form a strong relationship in pairs, triplets, or collectively. In some instances, it might be necessary for relationships to span multiple credentials to establish a relationship between one data point and a person's identity. As an example, a severed finger found in Montana by police might be matched to a 30 year old fingerprint record for Suzy Smith in Tucson, Arizona; that fingerprint record might be matched to a graduation record for Suzy Smith from Tucson High School; that record might be matched to a newspaper article saying that Suzy Smith was admitted to University of Toledo; that article might be matched to a marriage license in Toledo, Ohio for Suzy Smith and John Jones; that marriage license might be matched to a record showing that Suzy Jones attended New York University medical school; and that name might be matched to a police report indicating that Dr. S. Jones of Battle Creek, Michigan was the subject of a missing person report shortly before the severed finger was found. This might lead to a relationship of strong or weak strength between Dr. Suzy Jones and the severed finger. As one of ordinary skill will understand, there may be many other paths that might be followed that might suggest additional links to the same person or that might suggest links to different persons with various strengths. Thus, to determine identity, it might be necessary to consider or rank relationships of varying strength.

Figure 5:
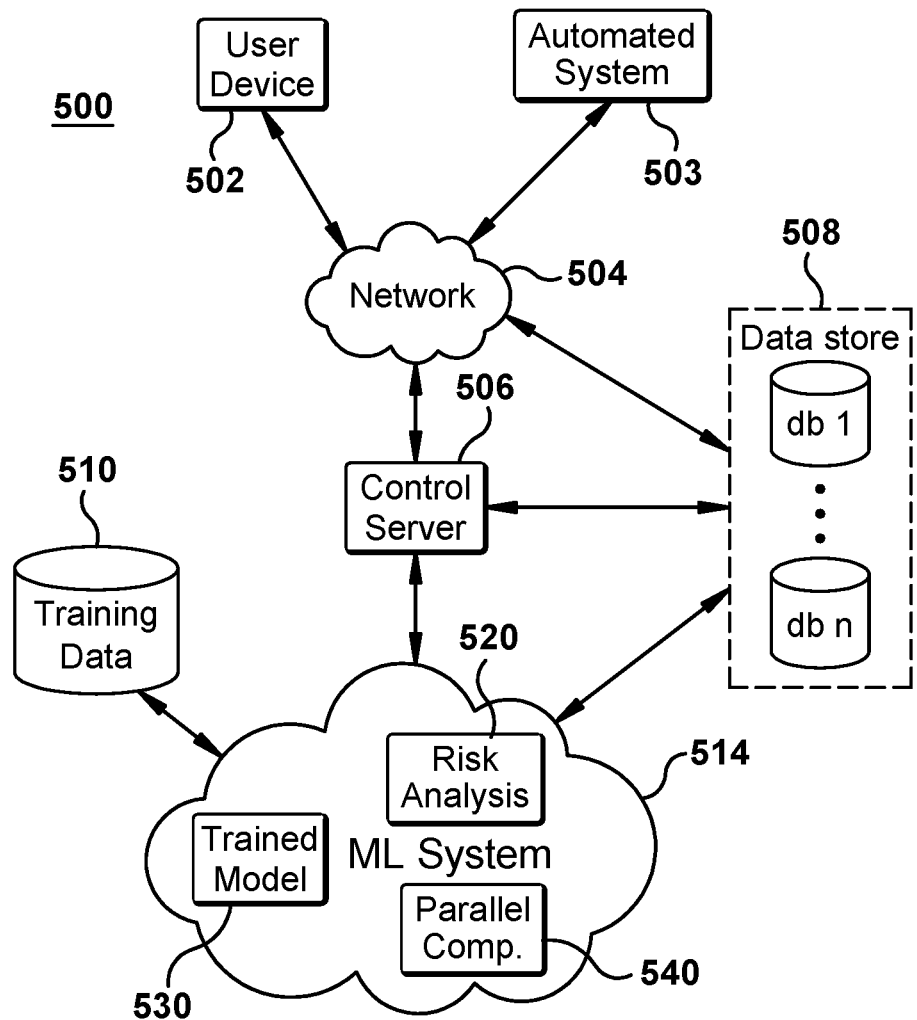
FIG. 5 is a block diagram of an illustrative architecture for management and curation of continuous identity.

FIG. 5 depicts a functional block diagram illustrating an exemplary environment 500 suitable for use with aspects of the disclosed subject matter. For instance, it depicts an exemplary set of devices, parties or participants communicatively coupled to each other and involved in the provision, collection, use, and distribution of identity information. For example, a user device 502 can provide and receive information, through communication network 504, to and from other devices communicatively coupled to communication network 504.

A user device 502 may be a hardware device and may comprise a computer application. Though only one user device 502 is depicted, it is to be understood that in many networks it is possible to connect and communicate with multiple user devices 502. User device 502 may be communicatively coupled to network 504 via wired, wireless, or combination connections. As a non-limiting example, user device 502 may be a mobile or stationary computer, a mobile phone, an augmented reality device, or other such hardware as may become available and allow such communication.

Automated system 503 may also provide and receive information, through network 504, to and from other devices communicatively coupled to the network 504. Automated system 503 may be a system that is largely or wholly controlled by an artificial intelligence ("AI") or machine learning ("ML") algorithm, or system 503 may be largely or wholly controlled by a human or other non-learning computer systems.

Similar to user device 502, automated system 503 may be a hardware device and may comprise a computer application. Though only one automated system 503 is depicted, it is to be understood that in many networks it is possible to connect and communicate with multiple automated systems 503. Automated system 503 may be communicatively coupled to network 504 via wired, wireless, or combination connections. As a non-limiting example, Automated system 503 may be a mobile or stationary computer, a mobile phone, an augmented reality device, or other such hardware as may become available and allow implementation of such systems with communication.

Control server 506 may comprise a suitable computer server which may include a web server, file server, or other server along with appropriate control mechanisms. Control server 506 may be configured to receive data including control requests or commands from user device 502 and/or automated system 503. Such requests or commands may be conveyed via network 504.

Data store 508 may be connected communicatively to control server 506, network 504, and/or machine learning system 514. Training data store 510 is preferably communicatively coupled to at least machine learning system 514.

Machine learning system 514 may be implemented using various frameworks. Preferably a parallel processing framework 540 is employed. It is also desirable to implement a training model 530. For purposes of determining an entity's identity in real-time, it is desirable to implement a risk analysis module 520 within machine learning system 514, to permit identification and implementation of various risk models depending on the risk tolerance desired or permitted for the particular identification task that is being performed.

Communication network 504 may include wired and/or wireless network components, such as the Internet, cellular, or local area wireless networks. Communication network 504 may also include networks such as Bluetooth and infrared networks. Communications on communications network 504 may be encrypted or otherwise secured using any suitable security or encryption protocol.

Control server 506, which may include any network server or virtual server, such as a file or web server, may access data sources db1 . . . dbn in data store 508 locally or over a suitable network connection such as network 504. Control server 506 may also include processing circuitry (e.g., one or more computer processors or microprocessors), memory (e.g., RAM, ROM, and/or hybrid types of memory), and one or more storage devices (e.g., hard drives, optical drives, flash drives, etc.). The processing circuitry included in control server 506 may execute processors capable of executing various processes in parallel. Server 506 may be able to receive, process, and distribute information generated by an application executing on a user device 502, such as a computer or a mobile device (e.g., a cell phone, a wearable mobile device such as an augmented reality device, etc.). The processing circuitry included in control server 506 may also perform a host of calculations and computations that may be needed in managing and determining continuous identity. In some embodiments, a computer-readable medium with computer program logic recorded thereon is included within control server 506. The computer program logic may perform various of the steps described herein with respect to identity determination.

Control server 506 may access data sources in data store 508 over the Internet, a secured private LAN, or other communications network. Data sources in data store 508 may include one or more third-party data sources, such as data from any of the numerous sources of data reflected in FIG. 2, or other relevant sources. For example, data sources in data store 508 may include identity-related data from one or more of social networks, government identity databases, biomarker identity databases, credit bureaus, banks, retailers, or various information services. Data sources in data store 508 may also include data stores and databases local to control server 506 containing identity-related information (e.g., databases of addresses, legal records, transportation passenger lists, gambling patterns, political and/or charity donations, political affiliations, vehicle license plate or identification numbers, universal product codes, news articles, business listings, and hospital or university affiliations).

Control server 506 may be in communication with machine learning system 514. Machine learning system 514, which may include any parallel or distributed computational framework or cluster, may be configured to divide computational jobs into smaller jobs to be performed simultaneously, in a distributed fashion, or both. For example, machine learning system 514 may support data-intensive distributed applications by implementing a map/reduce computational paradigm where the applications may be divided into a plurality of small fragments of work, each of which may be executed or re-executed on any core processor in a cluster of cores. A suitable example of machine learning system 514 includes an Apache Hadoop cluster.

Machine learning system 514 may interface with training data store 510 and/or data store 508, which also may take the form of a cluster of cores. For example, machine learning system 514 may express a large, distributed computation as a sequence of distributed operations on data sets by dividing the operations into jobs. Such jobs may be executed across a plurality of nodes in the cluster of parallel computational framework 540. The processing and computations described herein may be performed, at least in part, by any type of processor or combination of processors. For example, various types of quantum processors (e.g., solid-state quantum processors and light-based quantum processors), artificial neural networks, and the like may be used to perform massively parallel computing and processing.

Machine learning system 514 may distribute the many tasks across a cluster of nodes and provide the appropriate fragment of intermediate data to each task.

Tasks in each phase may be executed in a fault-tolerant manner, so that if one or more nodes fail during a computation the tasks assigned to such failed nodes may be redistributed across the remaining nodes. This behavior may allow for load balancing and for failed tasks to be re-executed with low runtime overhead.

Data sources in data store 508 and training data store 510 may implement any distributed file system capable of storing large files reliably. For example, they may implement Hadoop's own distributed file system (DFS) or a more scalable column-oriented distributed database, such as HBase, or other data storage and analysis systems such as Google BigQuery, Apache Spark, Snowflake, etc. Such file systems or databases may include BigTable-like capabilities, such as support for an arbitrary number of table columns.

Although FIG. 5, in order to not over-complicate the drawing, only shows a single instance of user device 502, automated system 503, communications network 504, control server 506, data store 508, training data 510, and machine learning system 514, in practice architecture 500 may include multiple instances of one or more of the foregoing components. In addition, certain elements may also be removed, in some embodiments.

Figure 6:
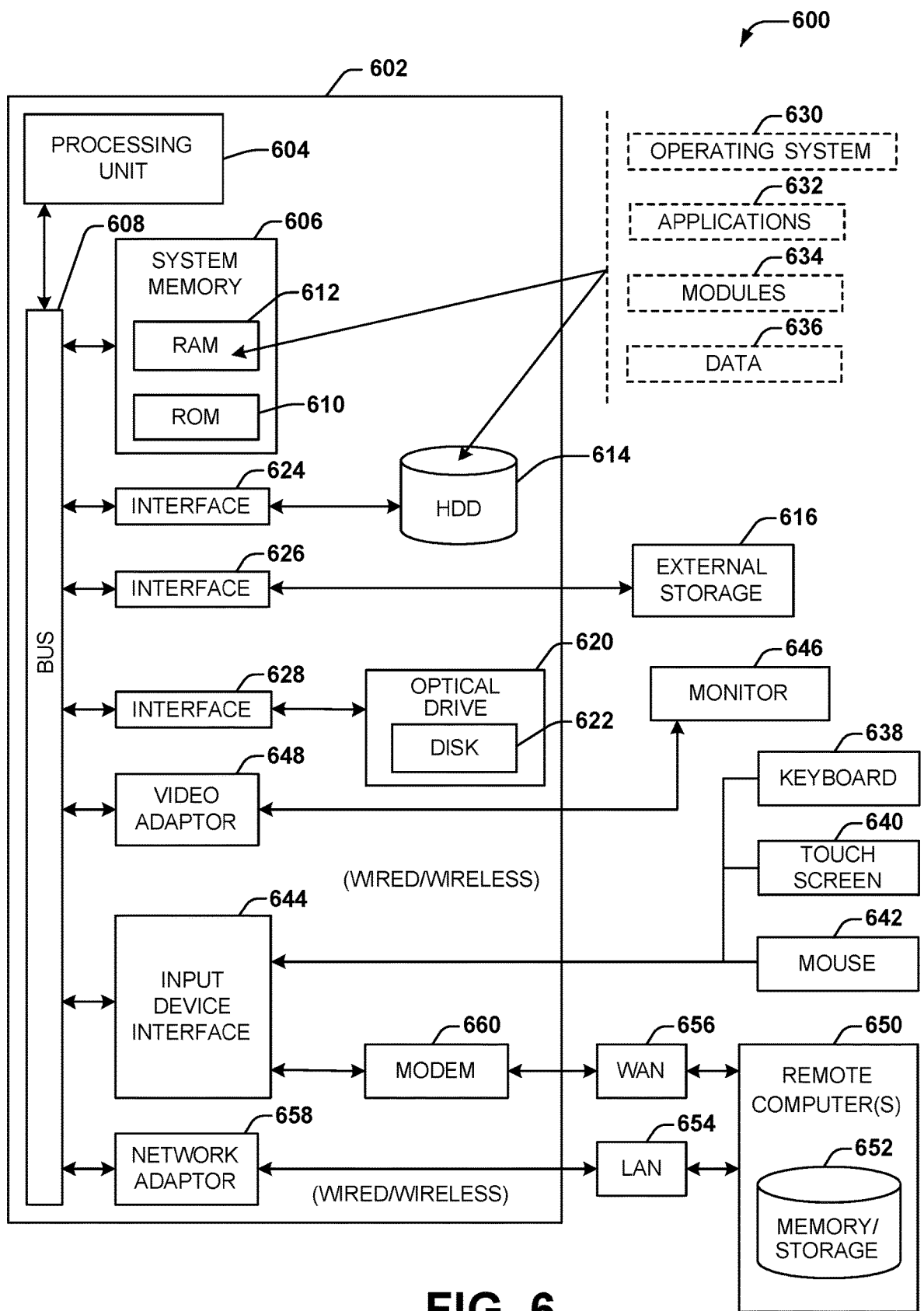
FIG. 6 is a block diagram of an illustrative architecture of a computer that may be used in a system or method for management and curation of continuous identity.

To provide additional context for various embodiments described herein, FIG. 6 and the following discussion are intended to provide a brief, general description of a suitable computing environment 600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that portions of the inventive methods can be practiced with other computer system configurations, including single-processor or multiprocessor computer systems, minicomputers, mainframe computers, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 6, the example environment 600 for implementing various embodiments of the aspects described herein includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 includes ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also include a high-speed RAM such as static RAM for caching data.

The computer 602 further includes an internal hard disk drive (HDD) 614 (e.g., EIDE, SATA), one or more external storage devices 616 (e.g., a magnetic floppy disk drive (FDD) 616, a memory stick or flash drive reader, a memory card reader, etc.) and an optical disk drive 620 (e.g., which can read or write from a CD-ROM disc, a DVD, a BD, etc.). While the internal HDD 614 is illustrated as located within the computer 602, the internal HDD 614 can also be configured for external use in a suitable chassis (not shown). Additionally, while not shown in environment 600, a solid state drive (SSD) could be used in addition to, or in place of, an HDD 614. The HDD 614, external storage device(s) 616 and optical disk drive 620 can be connected to the system bus 608 by an HDD interface 624, an external storage interface 626 and an optical drive interface 628, respectively. The interface 624 for external drive implementations can include at least one or both of Universal Serial Bus (USB) and Institute of Electrical and Electronics Engineers (IEEE) 694 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 612, including an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

Computer 602 can optionally comprise emulation technologies. For example, a hypervisor (not shown) or other intermediary can emulate a hardware environment for operating system 630, and the emulated hardware can optionally be different from the hardware illustrated in FIG. 6. In such an embodiment, operating system 630 can comprise one virtual machine (VM) of multiple VMs hosted at computer 602. Furthermore, operating system 630 can provide runtime environments, such as the Java runtime environment or the .NET framework, for applications 632. Runtime environments are consistent execution environments that allow applications 632 to run on any operating system that includes the runtime environment. Similarly, operating system 630 can support containers, and applications 632 can be in the form of containers, which are lightweight, standalone, executable packages of software that include, e.g., code, runtime, system tools, system libraries and settings for an application.

A user can preferably enter commands and information into the computer 602 through one or more wired/wireless input devices, e.g., a keyboard 638, a touch screen 640, and a pointing device, such as a mouse 642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 604 through an input device interface 644 that can be coupled to the system bus 608, but can be connected by other interfaces, such as a parallel port, an IEEE 1394 serial port, a game port, a USB port, an IR interface, a BLUETOOTH® interface, etc.

A monitor 646 or other type of display device can also be connected to the system bus 608 via an interface, such as a video adapter 648. In addition to the monitor 646, a computer typically includes other peripheral output devices (not shown), such as speakers, printers, etc.

The computer 602 can operate in a networked environment using logical connections via wired and/or wireless communications to one or more remote computers, such as a remote computer(s) 650. The remote computer(s) 650 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 652 is illustrated. The logical connections depicted include wired/wireless connectivity to a local area network (LAN) 654 and/or larger networks, e.g., a wide area network (WAN) 656. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local network 654 through a wired and/or wireless communication network interface or adapter 658. The adapter 658 can facilitate wired or wireless communication to the LAN 654, which can also include a wireless access point (AP) disposed thereon for communicating with the adapter 658 in a wireless mode.

When used in a WAN networking environment, the computer 602 can include a modem 660 or can be connected to a communications server on the WAN 656 via other means for establishing communications over the WAN 656, such as by way of the Internet. The modem 660, which can be internal or external and a wired or wireless device, can be connected to the system bus 608 via the input device interface 644. In a networked environment, program modules depicted relative to the computer 602 or portions thereof, can be stored in the remote memory/storage device 652. It will be appreciated that the network connections shown are example and other means of establishing a communications link between the computers can be used.

When used in either a LAN or WAN networking environment, the computer 602 can access cloud storage systems or other network-based storage systems in addition to, or in place of, external storage devices 616 as described above. Generally, a connection between the computer 602 and a cloud storage system can be established over a LAN 654 or WAN 656 e.g., by the adapter 658 or modem 660, respectively. Upon connecting the computer 602 to an associated cloud storage system, the external storage interface 626 can, with the aid of the adapter 658 and/or modem 660, manage storage provided by the cloud storage system as it would other types of external storage. For instance, the external storage interface 626 can be configured to provide access to cloud storage sources as if those sources were physically connected to the computer 602.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

It can be further understood that while a brief overview of exemplary systems, methods, scenarios, and/or devices has been provided, the disclosed subject matter is not so limited. Thus, it can be further understood that various modifications, alterations, addition, and/or deletions can be made without departing from the scope of the embodiments as described herein. Accordingly, similar non-limiting implementations can be used or modifications and additions can be made to the described embodiments for performing the same or equivalent function of the corresponding embodiments without deviating therefrom.

One of ordinary skill in the art can appreciate that the various embodiments of the disclosed subject matter and related systems, devices, and/or methods described herein can be implemented in connection with various computer or other client or server device, which can be deployed as part of a communications system, a computer network, and/or in a distributed computing environment, and can be connected to any kind of data store. In this regard, the various embodiments described herein can be implemented in several types of computer system or environment having any number of memory or storage units, and many applications and processes occurring across any number of storage units or volumes, which may be used in connection with communication systems using the techniques, systems, and methods in accordance with the disclosed subject matter. The disclosed subject matter can apply to an environment with server computers and client computers deployed in a network environment or a distributed computing environment, having remote or local storage. The disclosed subject matter can also be applied to standalone computing devices, having programming language functionality, interpretation and execution capabilities for generating, receiving, storing, and/or transmitting information in connection with remote or local services and processes.

Distributed computing provides sharing of computer resources and services by communicative exchange among computing devices and systems. These resources and services can include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices can have applications, objects or resources that may utilize disclosed and related systems, devices, and/or methods as described for various embodiments of the subject disclosure.

Those skilled in the art will recognize that it is common within the art to describe devices and/or processes in the fashion set forth herein, and thereafter use engineering practices to integrate such described devices and/or processes into systems. That is, at least a portion of the devices and/or processes described herein can be integrated into a system via a reasonable amount of experimentation. Those having skill in the art will recognize that a typical system can include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control device (e.g., feedback for sensing position and/or velocity; control devices for moving and/or adjusting parameters). A typical system can be implemented utilizing any suitable commercially available components, such as those typically found in data computing/communication and/or network computing/communication systems.

Various embodiments of the disclosed subject matter sometimes illustrate different components contained within, or connected with, other components. It is to be understood that such depicted architectures are merely exemplary, and that, in fact, many other architectures can be implemented which achieve the same and/or equivalent functionality. In a conceptual sense, any arrangement of components to achieve the same and/or equivalent functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," "operably coupled," "communicatively connected," and/or "communicatively coupled," to each other to achieve the desired functionality, and any two components capable of being so associated can also be viewed as being "operably couplable" or "communicatively couplable" to each other to achieve the desired functionality. Specific examples of operably couplable or communicatively couplable can include, but are not limited to, physically mateable and/or physically interacting components, wirelessly interactable and/or wirelessly interacting components, and/or logically interacting and/or logically interactable components.

With respect to substantially any plural and/or singular terms used herein, those having skill in the art can translate from the plural to the singular and/or from the singular to the plural as can be appropriate to the context and/or application. The various singular/plural permutations may be expressly set forth herein for the sake of clarity, without limitation.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes, but is not limited to," etc.). It will be further understood by those skilled in the art that, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limit any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those skilled in the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be noted that various embodiments of the disclosed subject matter have been described herein for purposes of illustration, and that various modifications may be made without departing from the scope and spirit of the subject disclosure. Accordingly, the various embodiments disclosed herein are not intended to be limiting, with the true scope and spirit being indicated by the appended claims.

In addition, the words "exemplary" and "non-limiting" are used herein to mean serving as an example, instance, or illustration. For the avoidance of doubt, the subject matter disclosed herein is not limited by such examples. Moreover, any aspect or design described herein as "an example," "an illustration." "exemplary" and/or "non-limiting" is not necessarily to be construed as preferred or advantageous over other aspects or designs, nor is it meant to preclude equivalent exemplary structures and techniques known to those of ordinary skill in the art. Furthermore, to the extent that the terms "includes," "has." "contains," and other similar words are used in either the detailed description or the claims, for the avoidance of doubt, such terms are intended to be inclusive in a manner similar to the term "comprising" as an open transition word without precluding any additional or other elements, as described above.

As mentioned, the various techniques described herein can be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a computer and the computer can be a component. In addition, one or more components can reside within a process and/or thread of execution and a component can be localized on one computer and/or distributed between two or more computers.

Systems described herein can be described with respect to interaction between several components. It can be understood that such systems and components can include those components or specified sub-components, some of the specified components or sub-components, or portions thereof, and/or additional components, and various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and that any one or more middle component layers, such as a management layer, can be provided to communicatively couple to such sub-components in order to provide integrated functionality, as mentioned. Any components described herein can also interact with one or more other components not specifically described herein but generally known by those of skill in the art.

As mentioned, in view of the exemplary systems described herein, methods that can be implemented in accordance with the described subject matter can be better appreciated with reference to the flowcharts of the various figures and vice versa. While for purposes of simplicity of explanation, the methods can be shown and described as a series of blocks, it is to be understood and appreciated that the claimed subject matter is not limited by the order of the blocks, as some blocks can occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks can be required to implement the methods described hereinafter.

While the disclosed subject matter has been described in connection with the disclosed embodiments and the various figures, it is to be understood that other similar embodiments may be used or modifications and additions may be made to the described embodiments for performing the same function of the disclosed subject matter without deviating therefrom. Furthermore, multiple processing chips or multiple devices can share the performance of one or more functions described herein, and similarly, storage can be effected across a plurality of devices. In other instances, variations of process parameters (e.g., configuration, number of components, aggregation of components, process step timing and order, addition and/or deletion of process steps, addition of preprocessing and/or post-processing steps, etc.) can be made to further optimize the provided structures, devices and methods, as shown and described herein. In any event, the systems, structures and/or devices, as well as the associated methods described herein have many applications in various aspects of the disclosed subject matter, and so on. Accordingly, the invention should not be limited to any single embodiment, but rather should be construed in breadth, spirit and scope in accordance with the appended claims.

What is claimed is:

1. A system for determining continuous identity in real-time comprising:
   a computer network connection for receiving at a first time, a request to verify the identity of an individual including a plurality of partial identifiers provided with the request;
   a first database on a first server storing a plurality of identification credentials for each of a plurality of individuals,
      wherein different types of identification credentials may be stored and accessed within the first database for different individuals of the plurality of individuals,
      wherein a plurality of the different types of identification credentials for any individual of the plurality of individuals include various types of information that are not overlapping,
      wherein one or more of the different types of identification credentials for any individual of the plurality of individuals might be expired,
      wherein one or more of the different types of identification credentials for any individual of the plurality of individuals might not be expired;
   a second database on the first server for storing information regarding the strength of relationships between the plurality of identification credentials stored in the first database;
   a parallel processing system for applying a machine learning algorithm to the plurality of partial identifiers, the plurality of identification credentials, and the strengths of relationships, to determine whether the identity of the individual can be verified, refuted, or neither,
      wherein the machine learning algorithm establishes and applies weights to various of the relationships based upon training and feedback,
      wherein the machine learning algorithm applies a tunable risk tolerance to the determination; and
   a memory comprising computer executable instructions for transmitting at a second time, a response to the request to verify the identity,
   wherein the system may be scaled by addition of further parallel processing resources, such that the rate at which the machine learning algorithm processes a plurality of individuals scales substantially linearly over time with addition of an equal number of parallel processing resources and requests to verify; and
   the memory further comprises computer executable instructions for providing a precise explanation of objective parameters used by the machine learning algorithm to determine whether the identity of the individual can be verified, refuted, or neither.

2. The system of claim 1, wherein the memory further comprises computer executable instructions for:
   periodically updating the first database to store further identification credentials for one or more of the plurality of individuals;
   after updating the first database, updating the second database to add or modify one or more relationship strengths based upon the further identification credentials stored during the update; and
   applying the machine learning algorithm to the plurality of partial identifiers, the plurality of identification credentials, and the strengths of relationships, to update the determination of whether the identity of the individual can be verified, refuted, or neither.

3. The system of claim 1, wherein the request to verify the identity of an individual further comprises a first indication of risk tolerance for use by the machine learning algorithm.

4. The system of claim 1, wherein the memory further comprises computer executable instructions for:
   receiving at a third time, via the computer network connection, a second request to verify the identity of a second individual including a second plurality of partial identifiers provided with the request and a second indication of risk tolerance for use by the machine learning algorithm,
   wherein the second indication of risk tolerance is different than the first indication of risk tolerance; and
   applying the machine learning algorithm to the second plurality of partial identifiers, the plurality of identification credentials, the strengths of relationships, and the second indication of risk tolerance, to determine whether the identity of the individual can be verified, refuted, or neither.

5. A system for determining continuous identity in real-time comprising:
   a computer network connection for receiving at a first time, a request to verify the identity of an individual including a plurality of partial identifiers provided with the request and a first indication of required minimum level of the strength of relationships between a plurality of identification credentials stored in a first database for use by a machine learning algorithm;
   the first database on a first server storing the plurality of identification credentials for each of a plurality of individuals, wherein different types of identification credentials may be stored and accessed within the first database for different individuals of the plurality of individuals, wherein a plurality of the different types of identification credentials for any individual of the plurality of individuals include various types of information that are not overlapping, wherein one or more of the different types of identification credentials for any individual of the plurality of individuals might be expired, wherein one or more of the different types of identification credentials for any individual of the plurality of individuals might not be expired;

a second database on the first server for storing information regarding the strength of relationships between the plurality of identification credentials stored in the first database;

a parallel processing system for applying the machine learning algorithm to the plurality of partial identifiers, the plurality of identification credentials, and the strengths of relationships, to determine whether the identity of the individual can be verified, refuted, or neither, wherein the machine learning algorithm establishes and applies weights to various of the relationships based upon training and feedback, wherein the machine learning algorithm applies a tunable risk tolerance to the determination; and a memory comprising computer executable instructions for transmitting at a second time, a response to the request to verify the identity, wherein the system may be scaled by addition of further parallel processing resources, such that the rate at which the machine learning algorithm processes a plurality of individuals scales substantially linearly over time with addition of an equal number of parallel processing resources and requests to verify.

6. The system of claim 5, wherein the memory further comprises computer executable instructions for:
assigning authoritative status to one or more of the plurality of identification credentials stored in the first database.

7. The system of claim 1, wherein the memory further comprises computer executable instructions for:
assigning authoritative status to one or more of the plurality of identification credentials stored in the first database.

8. A method for determining continuous identity in real-time comprising:
receiving at a first time, via computer network, a request to verify the identity of an individual including a plurality of partial identifiers provided with the request;
accessing a first database storing a plurality of identification credentials for each of a plurality of individuals,
wherein different types of identification credentials may be stored and accessed within the first database for different individuals of the plurality of individuals,
wherein a plurality of the different types of identification credentials for any individual of the plurality of individuals include various types of information that are not overlapping,
wherein one or more of the different types of identification credentials for any individual of the plurality of individuals might be expired,
wherein one or more of the different types of identification credentials for any individual of the plurality of individuals might not be expired;
accessing a second database storing information regarding the strength of relationships between the plurality of identification credentials stored in the first database;
applying a machine learning algorithm to the plurality of partial identifiers, the plurality of identification credentials, and the strengths of relationships, to determine whether the identity of the individual can be verified, refuted, or neither,
wherein the machine learning algorithm establishes and applies weights to various of the relationships based upon training and feedback,
wherein the machine learning algorithm applies a tunable risk tolerance to the determination
transmitting at a second time, a response to the request to verify the identity, wherein the rate at which the machine learning algorithm processes a plurality of individuals scales substantially linearly over time with application of an equal number of resources and requests to verify; and
providing a precise explanation of objective parameters used by the machine learning algorithm to determine whether the identity of the individual can be verified, refuted, or neither.

9. The method of claim 8, further comprising:
periodically updating the first database to store further identification credentials for one or more of the plurality of individuals;
after updating the first database, updating the second database to add or modify one or more relationship strengths based upon the further identification credentials stored during the update; and
applying the machine learning algorithm to the plurality of partial identifiers, the plurality of identification credentials, and the strengths of relationships, to update the determination of whether the identity of the individual can be verified, refuted, or neither.

10. The method of claim 8, wherein the request to verify the identity of an individual further comprises a first indication of risk tolerance for use by the machine learning algorithm.

11. The method of claim 10, further comprising:
receiving at a third time, via computer network, a second request to verify the identity of a second individual including a second plurality of partial identifiers provided with the request and a second indication of risk tolerance for use by the machine learning algorithm,
wherein the second indication of risk tolerance is different than the first indication of risk tolerance; and
applying the machine learning algorithm to the second plurality of partial identifiers, the plurality of identification credentials, the strengths of relationships, and the second indication of risk tolerance, to determine whether the identity of the individual can be verified, refuted, or neither.

12. A method for determining continuous identity in real-time comprising:
receiving at a first time, via computer network, a request to verify the identity of an individual including a plurality of partial identifiers provided with the request and a first indication of required minimum level of the strength of relationships between a plurality of identification credentials stored in a first database for use by a machine learning algorithm;

accessing the first database storing the plurality of identification credentials for each of a plurality of individuals,
    wherein different types of identification credentials may be stored and accessed within the first database for different individuals of the plurality of individuals,
    wherein a plurality of the different types of identification credentials for any individual of the plurality of individuals include various types of information that are not overlapping,
    wherein one or more of the different types of identification credentials for any individual of the plurality of individuals might be expired,
    wherein one or more of the different types of identification credentials for any individual of the plurality of individuals might not be expired;
accessing a second database storing information regarding the strength of relationships between the plurality of identification credentials stored in the first database;
applying the machine learning algorithm to the plurality of partial identifiers, the plurality of identification credentials, and the strengths of relationships, to determine whether the identity of the individual can be verified, refuted, or neither,
    wherein the machine learning algorithm establishes and applies weights to various of the relationships based upon training and feedback,
    wherein the machine learning algorithm applies a tunable risk tolerance to the determination; and
transmitting at a second time, a response to the request to verify the identity, wherein the rate at which the machine learning algorithm processes a plurality of individuals scales substantially linearly over time with application of an equal number of resources and requests to verify.

13. The method of claim 12, further comprising assigning authoritative status to one or more of the plurality of identification credentials stored in the first database.

14. The method of claim 8, further comprising assigning authoritative status to one or more of the plurality of identification credentials stored in the first database.

15. A non-transitory computer-readable storage medium comprising:
    instructions that, when executed by a device comprising a processor, facilitate performance of operations comprising:
        receiving at a first time, via computer network, a request to verify the identity of an individual including a plurality of partial identifiers provided with the request;
        accessing a first database storing a plurality of identification credentials for each of a plurality of individuals,
            wherein different types of identification credentials may be stored and accessed within the first database for different individuals of the plurality of individuals,
            wherein a plurality of the different types of identification credentials for any individual of the plurality of individuals include various types of information that are not overlapping,
            wherein one or more of the different types of identification credentials for any individual of the plurality of individuals might be expired,
            wherein one or more of the different types of identification credentials for any individual of the plurality of individuals might not be expired;
        accessing a second database storing information regarding the strength of relationships between the plurality of identification credentials stored in the first database;
        applying a machine learning algorithm to the plurality of partial identifiers, the plurality of identification credentials, and the strengths of relationships, to determine whether the identity of the individual can be verified, refuted, or neither,
            wherein the machine learning algorithm establishes and applies weights to various of the relationships based upon training and feedback,
            wherein the machine learning algorithm applies a tunable risk tolerance to the determination; and
        transmitting at a second time, a response to the request to verify the identity,
        wherein when executing the instructions, the rate at which the machine learning algorithm processes a plurality of individuals scales substantially linearly over time with application of an equal number of resources and requests to verify; and
        providing a precise explanation of objective parameters used by the machine learning algorithm to determine whether the identity of the individual can be verified, refuted, or neither.

16. The medium of claim 15, further comprising instructions that, when executed by a device comprising a processor, facilitate performance of operations comprising:
    periodically updating the first database to store further identification credentials for one or more of the plurality of individuals;
    after updating the first database, updating the second database to add or modify one or more relationship strengths based upon the further identification credentials stored during the update; and
    applying the machine learning algorithm to the plurality of partial identifiers, the plurality of identification credentials, and the strengths of relationships, to update the determination of whether the identity of the individual can be verified, refuted, or neither.

17. The medium of claim 15, wherein the request to verify the identity of an individual further comprises a first indication of risk tolerance for use by the machine learning algorithm.

18. The medium of claim 15, further comprising instructions that, when executed by a device comprising a processor, facilitate performance of operations comprising:
    receiving at a third time, via computer network, a second request to verify the identity of a second individual including a second plurality of partial identifiers provided with the request and a second indication of risk tolerance for use by the machine learning algorithm,
    wherein the second indication of risk tolerance is different than the first indication of risk tolerance; and
    applying the machine learning algorithm to the second plurality of partial identifiers, the plurality of identification credentials, the strengths of relationships, and the second indication of risk tolerance, to determine whether the identity of the individual can be verified, refuted, or neither.

19. A non-transitory computer-readable storage medium comprising:
    instructions that, when executed by a device comprising a processor, facilitate performance of operations comprising:

receiving at a first time, via computer network, a request to verify the identity of an individual including a plurality of partial identifiers provided with the request and a first indication of required minimum level of the strength of relationships between a plurality of identification credentials stored in a first database for use by a machine learning algorithm;

accessing the first database storing the plurality of identification credentials for each of a plurality of individuals, wherein different types of identification credentials may be stored and accessed within the first database for different individuals of the plurality of individuals, wherein a plurality of the different types of identification credentials for any individual of the plurality of individuals include various types of information that are not overlapping, wherein one or more of the different types of identification credentials for any individual of the plurality of individuals might be expired, wherein one or more of the different types of identification credentials for any individual of the plurality of individuals might not be expired;

accessing a second database storing information regarding the strength of relationships between the plurality of identification credentials stored in the first database;

applying the machine learning algorithm to the plurality of partial identifiers, the plurality of identification credentials, and the strengths of relationships, to determine whether the identity of the individual can be verified, refuted, or neither, wherein the machine learning algorithm establishes and applies weights to various of the relationships based upon training and feedback, wherein the machine learning algorithm applies a tunable risk tolerance to the determination; and transmitting at a second time, a response to the request to verify the identity, wherein when executing the instructions, the rate at which the machine learning algorithm processes a plurality of individuals scales substantially linearly over time with application of an equal number of resources and requests to verify.

20. The medium of claim 19, wherein the request to verify the identity of an individual further comprises a first indication of risk tolerance for use by the machine learning algorithm.

* * * * *